United States Patent [19]

Koslow

[11] Patent Number: 5,700,371
[45] Date of Patent: Dec. 23, 1997

[54] WATER TREATMENT CARTRIDGE AND BASE

[75] Inventor: Evan E. Koslow, Weston, Conn.

[73] Assignee: KX Industries, L.P., Orange, Conn.

[21] Appl. No.: 637,231

[22] Filed: Apr. 24, 1996

[51] Int. Cl.⁶ .......................... B01D 27/08; B01D 27/04; B01D 27/14; B01D 35/30
[52] U.S. Cl. .......................... 210/232; 210/238; 210/282; 210/323.2; 210/496; 210/510.1
[58] Field of Search .................. 210/232, 282, 210/238, 323.2, 496, 510.1, 443

[56] References Cited

U.S. PATENT DOCUMENTS

| | | |
|---|---|---|
| 3,399,776 | 9/1968 | Knuth . |
| 4,559,136 | 12/1985 | Dockery . |
| 4,786,420 | 11/1988 | Dalessandro . |
| 4,915,831 | 4/1990 | Taylor . |
| 5,022,986 | 6/1991 | Lang . |
| 5,135,645 | 8/1992 | Sklenak . |
| 5,256,285 | 10/1993 | Tomita . |
| 5,397,462 | 3/1995 | Higashijima . |

FOREIGN PATENT DOCUMENTS

| | | |
|---|---|---|
| 318832 | 6/1989 | European Pat. Off. . |
| 1566502 | 4/1980 | United Kingdom . |

*Primary Examiner*—Thomas M. Lithgow
*Attorney, Agent, or Firm*—Ware, Fressola, Van der Sluys & Adolphson LLP

[57] ABSTRACT

A water treatment unit includes a base and a disposable, plug-in cartridge. The cartridge contains a pair of hollow cylindrical, porous, solid water treatment elements designed to treat water flowing radially through their walls. The cylindrical elements are mounted so as to act in parallel, thereby achieving the advantages of a long, thin-walled element in a compact configuration.

16 Claims, 3 Drawing Sheets

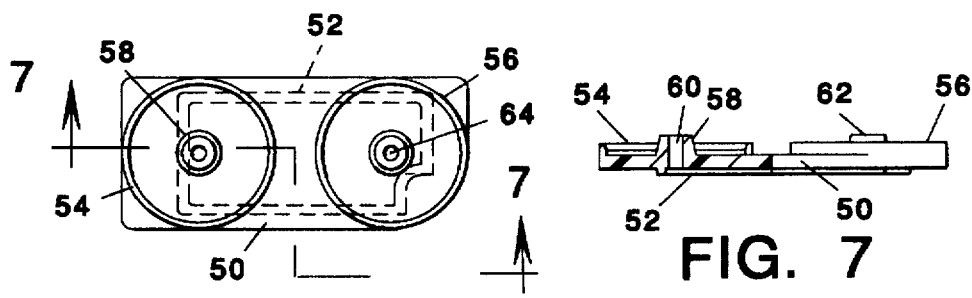
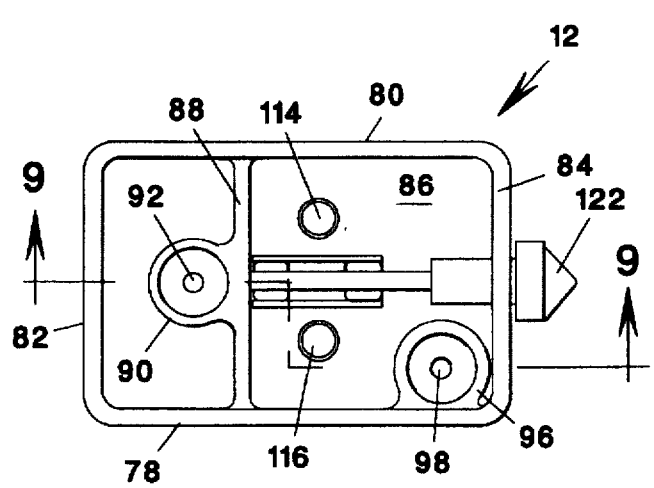
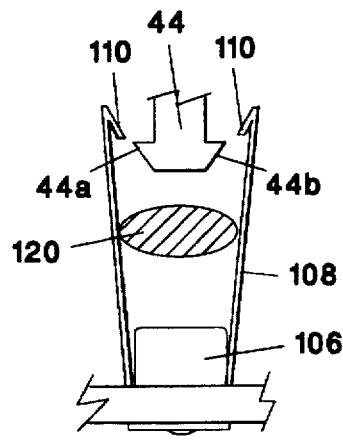
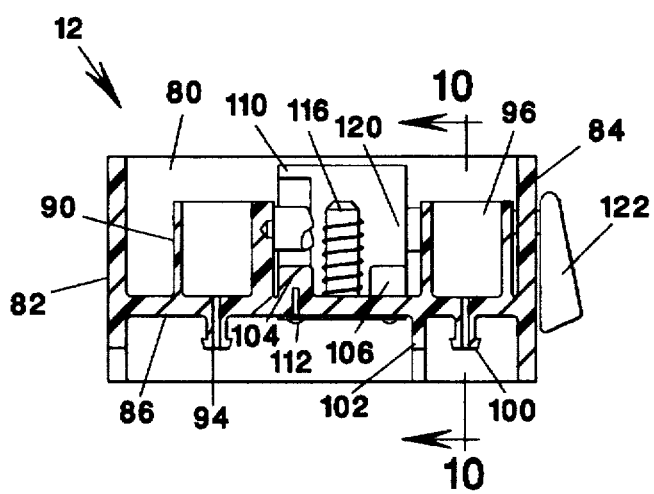
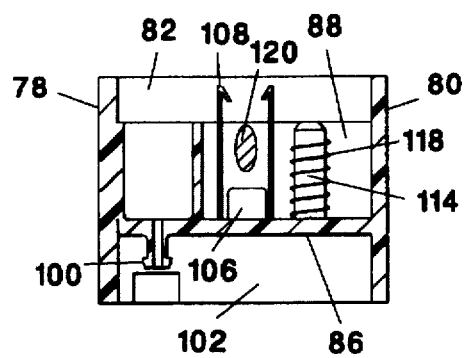

WATER TREATMENT CARTRIDGE AND BASE

TECHNICAL FIELD

This invention relates to apparatus for treating water. More particularly, it relates to water filtration apparatus in the form of a disposable cartridge and a base therefor.

BACKGROUND ART

The use of disposable water treatment elements such as filters is well-known. One type of such filter is in the form of a solid porous cylinder having a hollow center. When such an element is employed, the water or other liquid to be treated or filtered flows radially through the wall of the cylinder between its exterior and its hollow core. Examples of such an element are the well-known ceramic filter and the extruded solid activated carbon filters made by the method and apparatus disclosed in Koslow U.S. Pat. Nos. 5,189,092; 5,249,948; and 5,331,037. See also the co-pending U.S. patent application Ser. No. 08/607,294 filed Feb. 26, 1996 of Koslow, et al (pending).

It is well-known that the most efficient filtration is achieved with a relatively long but thin-walled filter element. For example, a long and thin cylinder will always display a lower pressure drop than a short and fat cylinder of the same volume of active ingredient, both because the flow area is larger and the thickness of the medium through which the fluid flows is reduced. However, this presents a problem, especially when the element is employed in a domestic water filtration unit such as might be maintained at a kitchen or bathroom sink. In order to achieve the desired flow volume, a long and ungainly filter element would be required. A second problem is that the changing of filter elements in the conventional domestic filter housing is a messy job often requiring tools and proving very difficult to open because of the large diameter pressure vessels with large threads and compression gaskets. Entirely new problems of space and convenience would emerge when using an exceptionally long filter element. Accordingly, it is a primary object of the present invention to provide an improved liquid treating apparatus and, more specifically, a water filtration apparatus which has the desirable characteristics of a thin-walled, hollow, cylindrical filter element but in a compact configuration. Another object is to provide such an apparatus wherein the filter element may be easily replaced and disposed of with a minimum of mess and water spillage. Another object is to provide such an apparatus wherein the filter elements are so arrayed as to present a relatively flat configuration more readily handled and stored than the usual prior art round array. Other objects, features, and advantages will become apparent from the following description and appended claims.

DISCLOSURE OF INVENTION

In accordance with the present invention, the desirable long and thin-walled solid porous hollow cylinder is reconfigured as two or more short cylindrical portions which are operated in a parallel fashion as a flat array. In this way, the efficiency and water volume is maintained but in a much more compact form. The filter elements are housed within a disposable cartridge which plugs into a base member from which it can be easily removed.

BRIEF DESCRIPTION OF DRAWINGS

FIG. 6 is a plan view of a filter support plate carded within the cartridge of FIGS. 1–3;

FIG. 7 is a partial cross-section taken substantially along the line 7—7 of FIG. 6;

FIG. 8 is a plan view of the base member of the invention;

FIG. 9 is a cross-section taken substantially along the line 9—9 of FIG. 8;

FIG. 10 is a cross-section taken substantially along the line 10—10 of FIG. 9;

FIG. 11 is an enlarged portion of FIG. 10 illustrating the latch release mechanism of the invention.

BEST MODE FOR CARRYING OUT THE INVENTION

Figure 12:
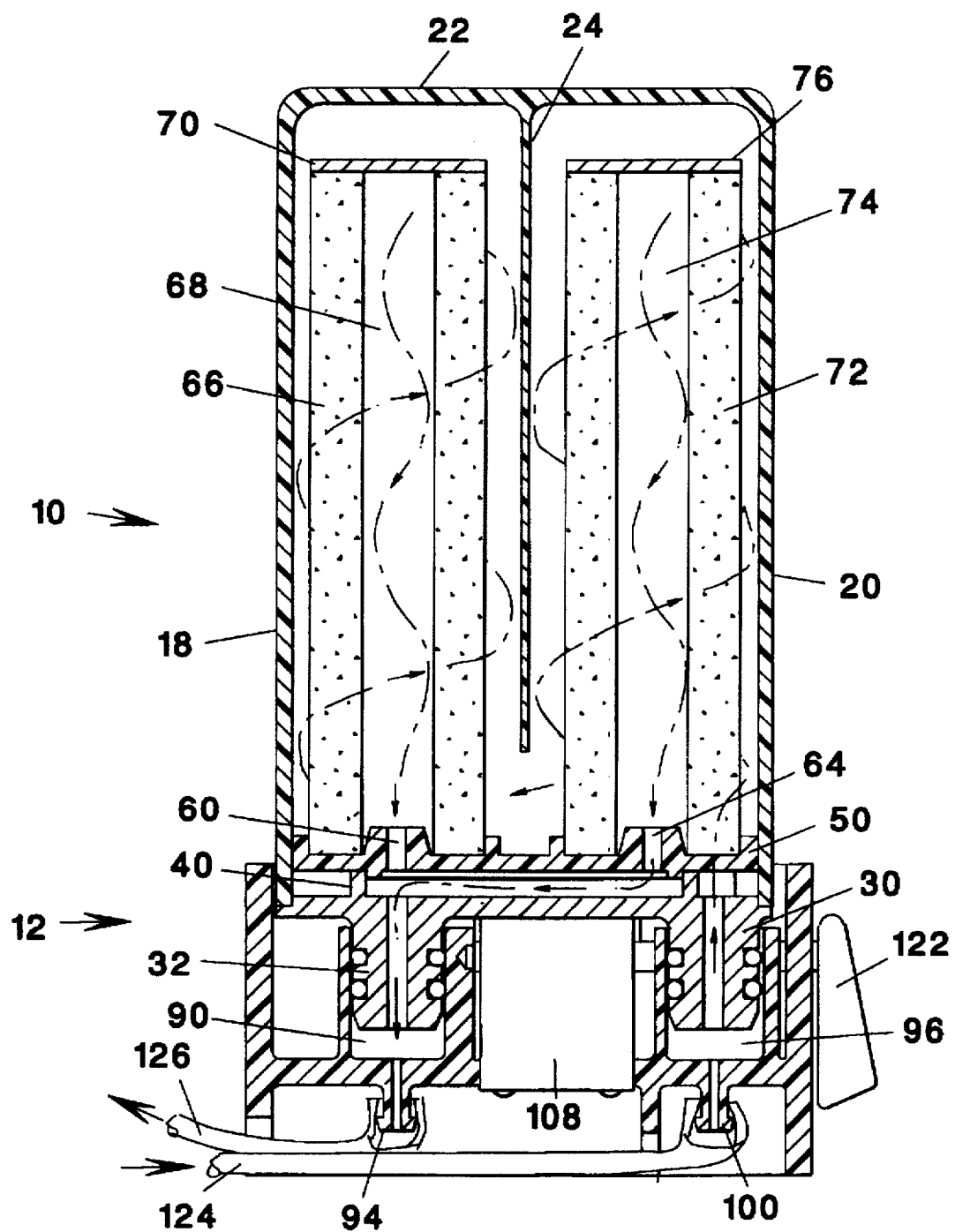
FIG. 12 is an elevational cross-section illustrating the filter cartridge connected to the base member and the water flow therethrough.

The invention comprises a base member and a filter cartridge which is insertable into the base member. The cartridge is illustrated by FIGS. 1–7 and the base by FIGS. 8–10. Reference may also be had to FIG. 12 which illustrates the cartridge 10 mounted in the base 12.

Cartridge

The cartridge 10 comprises a main housing of substantially rectangular cross-section comprising a front wall 14, a rear wall 16, left 18 and right 20 side walls, and a top wall 22 (FIG. 12). A stiffening web 24 extends downwardly from top wall 22 between front wall 14 and rear wall 16. The stiffening web performs the important function of preventing deformation of the housing when under full line water pressure. This allows for a relatively flat housing, as opposed to the cylindrical housings of the prior art. A cartridge base 26 closes the bottom of the housing. It is in the form of a base plate 28 from which extend a hollow water inlet stud 30 and a similar water outlet stud 32. The studs 30, 32 have axial bores 34, 36. They have circumferential grooves on their outer surfaces for the retention of rubber O-rings 38.

Figure 1:
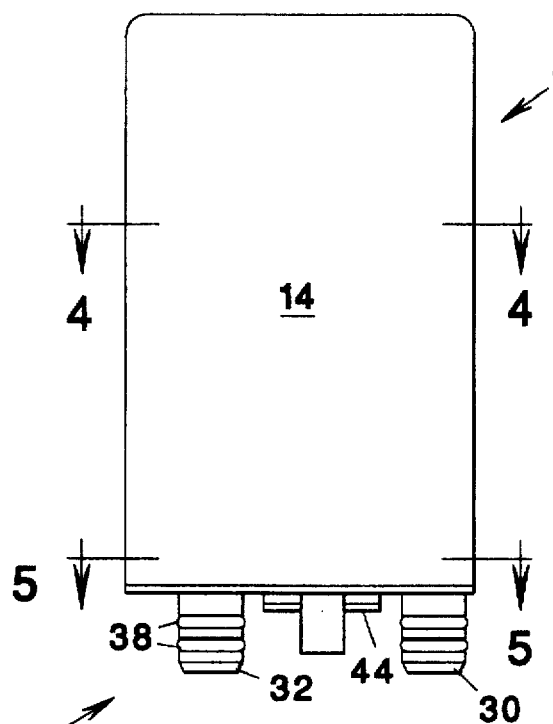
FIG. 1 is an elevational view of a filter cartridge in accordance with the present invention.
Figure 2:
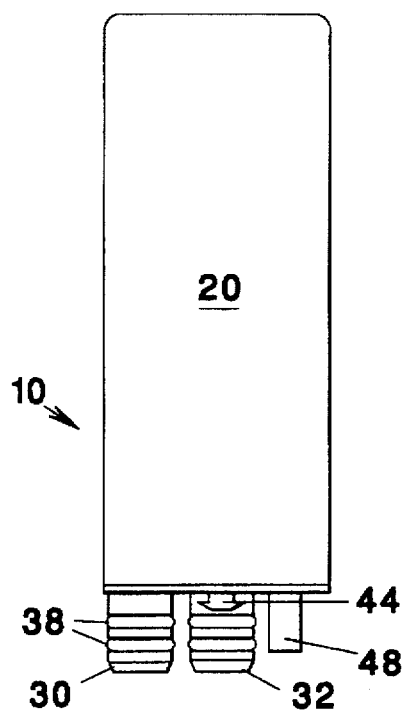
FIG. 2 is a right-side view of the cartridge of FIG. 1.
Figure 3:
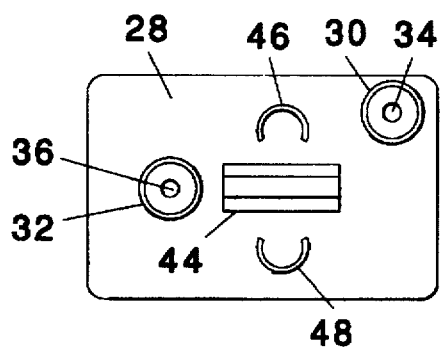
FIG. 3 is a bottom view of the cartridge of FIG. 1.
Figure 4:
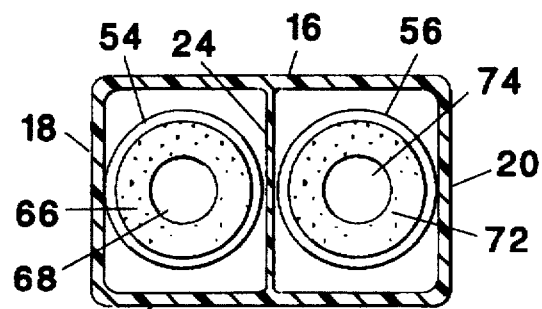
FIG. 4 is a cross-section taken substantially along the line 4—4 of FIG. 1.
Figure 5:
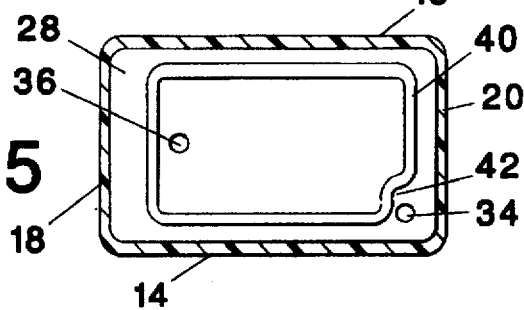
FIG. 5 is a cross-section taken substantially along the line 5—5 of FIG. 1.

The top surface of base plate 28 is illustrated in FIG. 5. It carries a raised dam 40 which is substantially rectangular and encompasses a bore 36 which extends through the water outlet stud 32. However, one corner is provided with an offset 42 which leaves the bore 34 of the water inlet stud 30 on the outside of the dam. Also carried on the bottom surface of the cartridge base plate 28 is a centrally positioned key 44 having a generally arrow shaped cross-section as seen in FIG. 2 whereby the barbs of the arrow define a pair of spaced detents. On either side of the key 44 is a semi-cylindrical socket 46, 48 whose function will be described hereafter.

Mounted on the top of the dam 40 is a filter support plate 50 illustrated most clearly in FIGS. 6 and 7. Filter support plate 50 is substantially rectangular so as to fit snugly within the housing walls of the cartridge 10 as illustrated in FIG. 12. Depending from the bottom surface of the filter support plate 50 is an alignment ring 52. The alignment ring 52 has essentially the same configuration as the dam 40 and is dimensioned to fit within the dam. Extending upwardly from the top surface of the filter support plate 50 are a pair of circular sockets 54, 56. Centrally located within the socket 54 is a frustoconical alignment stud 58 having a central passage 60 therethrough. A similar alignment stud 62 within the socket 56 defines a similar passage 64. Positioned within the socket 54 is the bottom end of a solid porous hollow cylindrical filter element 66. The filter element 66 includes a central bore 68 which extends alongs its longitudinal axis and its upper end is rendered impervious to flow by a suitable cap disk 70. Similarly mounted within the socket 56 is a similar filter element 72 which also has an axial bore 74 and a cap disk 76. In at least one actual embodiment, the preferred actual outer diameter of each filter element does not exceed approximately 1.75 inches to assure a flat array of relatively small size.

The illustrated cylindrical filter elements are discrete units. However, they could be extruded as interconnected cylinders—two cylinders connected by a web, for example. As used in the accompanying claims, the terms "at least two" and "a plurality" are to be construed as including such connected elements.

Base

The base member 12 is illustrated in FIGS. 8–12. It is in the form of a substantially rectangular frame including a front wall 78, rear wall 80, left end wall 82, and a right end wall 84. Extending between the four walls is a depressed floor 86. An interior transverse wall 88 extends between front wall 78 and rear wall 80 and centrally positioned along this wall is a circular socket 90. At the base of the socket 90 is a water outlet passage 92 which extends downwardly through a hose attachment member 94 which depends from the floor 86. A similar socket 96 is positioned in the lower right corner of the base member 12, as viewed in FIG. 8, and includes a similar water inlet passage 98 which extends through a similar hose attachment member 100 also depending from the floor 86. Adding support to the floor 86 is a depending transfer support wall 102 extending downwardly from the floor 86.

Centrally positioned within the base member 12 and extending upwardly from the floor 86 are a pair of substantially cubical alignment studs 104, 106. A pair of parallel slots (not shown) in the floor 86 receive the legs of a U-shaped spring clip 108. The upper edges of the spring clip legs are bent downwardly to form hooks 110 which form a latch. The legs of the spring clip 108 lie adjacent the studs 104, 106 and the spring clip is secured by means of screws or pins 112 which extend into the alignment studs 104, 106.

Extending upwardly from the floor 86 and on either side of the spring clip 108 are cylindrical posts 114, 116. Encircling each post is a helical compression spring 118. A shaft extends through the right end wall 84 and terminates in the transverse wall 88. The shaft includes a central portion 120 which is elliptical in cross-section and lies within the legs of the spring clip 108 as shown in FIG. 10. An external lever 122 is mounted to the end of the shaft to manually rotate it.

Operation

The apparatus of this invention comprises two separate and distinct units. The base member 12 is mounted to, or rests upon, a flat supporting surface such as a counter top. A water inlet hose 124 may be connected to the hose attachment member 100 and a water delivery hose 126 may be connected to the hose attachment member 94 as shown in FIG. 12. The separate cartridge member 10 is connected to the base member by inserting the studs 30, 32 into the sockets 90, 96. As these are inserted, the semi-cylindrical sockets 46, 48 depending from the cartridge 10 engage and depress the helical springs 118 carried by the posts 114, 116. As these springs are depressed, the key 44 enters within the legs of the spring clip 108, pushing them apart until the hooks 110 engage the upper surfaces of the detent barbs formed by the arrow shaped cross-section of the key 44, thereby locking the cartridge in position on the base member as illustrated in FIG. 12. The same springs aid the removal of the cartridge member 10 from the base member.

The operation of the unit will be best understood by referring to FIG. 12 wherein the water flow is illustrated by dashed lines and arrows. As shown therein, water flows into the base member and flows via socket 96 and water inlet stud 30 into the space surrounding the dam 40. It flows upwardly through the "missing" corner of the filter support plate 50 (FIG. 6) and fills the housing, forming a first volume surrounding the filter elements 66, 72. The stiffening web 24 extends only partially along the length of the cartridge housing and does not impede water flow. The water passes radially through the walls of the filter elements and into the bores 68, 74 passing downwardly through the passages 60, 64 in the filter support plate 50 into the region surrounded by the dam 40. The combined volume of the bores 68, 74 forms a second volume. The water then flows via water outlet stud 32 and the hose attachment member 94 and exits through the water outlet hose 126. The two filter elements receive water simultaneously. In this respect, they function identically to a single long filter element but acquire the mechanical advantages of a much smaller unit. It may be likened to a single element being cut into multiple sections with sections thereafter being operated in "parallel". This is of particular advantage in the case of solid activated carbon filters as referenced above. These filters, if not long and thin, are characterized by a high $\Delta P$.

When it is desired to change the cartridge and substitute a new one, it is merely necessary to rotate the lever 122 by 90°. This rotates the elliptical portion 120 of the shaft and forces the hooks 110 apart as illustrated in FIG. 11. This releases the key 44 on the cartridge and permits it to be detached whereupon a new cartridge may be inserted.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

I claim:

1. Liquid treating apparatus which comprises:
   A. a housing carrying a key member and containing at least two treatment elements, each of said treatment elements being substantially in the form of a solid porous cylinder having a bore therethrough along its longitudinal axis, the exteriors of said treatment elements and the interior of said housing forming a liquid reservoir;
   B. a base member releasably receiving said housing, said base member including
      i. means for supplying a liquid to be treated to one of said bores and said reservoir, said liquid passing radially through each of said porous cylinders,
      ii. means for delivering treated liquid from the other of said bores and reservoir; and
      iii. a latch for receiving said key member, wherein said key member includes a detent and said latch comprises a spring clip engageable with said detent; and
   C. said base member defining first and second sockets therein and said housing carrying first and second hollow studs insertable in said sockets to form, when so inserted, a liquid supplying channel and a liquid delivery channel.

2. The apparatus of claim 1 wherein said releasably securing means comprises means for selectively disengaging said spring clip from said detent.

3. The apparatus of claim 2 wherein said selectively disengaging means comprises:
   a camming member rotatable to retract said spring clip from said detent; and
   a lever mounted on said base member connected to rotate said camming member.

4. Water filtration apparatus which comprises:
   a base member defining first and second sockets therein;
   means for supplying water from an external source to one of said first and second sockets;
   means for delivering water from the other of said first and second sockets to an external application;
   a filtration cartridge having a one piece plastic housing substantially rectangular in cross section containing therein a plurality of solid, porous, substantially cylindrical, filter elements spaced from said housing to define a first volume therewith, each of said filter elements having a longitudinal axis and a bore extending therealong, the combined bores defining a second volume;
   a cartridge base plate closing said housing and carrying first and second studs having water passages therethrough and insertable, respectively, into said first and second sockets in water flow relationship with said water supplying and water delivering means;
   means within said cartridge for channeling water flow between said first stud and said first volume;
   means within said cartridge for channeling water flow between the second stud and said second volume;
   means for releasably securing said cartridge to said base member which comprises a key defining a detent thereon and being mounted on said cartridge, and a latch comprising a spring clip mounted on said base member to receive and secure said key and means for selectively releasing said latch from said key.

5. The apparatus of claim 4 wherein said latch comprises:
   a hook engageable with said detent; and
   means for resiliently urging said hook into engagement with said detent.

6. The apparatus of claim 5 wherein said selective releasing means comprises:
   a camming member rotatable to engage said resilient urging means and displace it from engagement with said detent; and
   means for manually rotating said camming member.

7. The apparatus of claim 6 wherein said resilient urging means comprises a leaf spring and said hook is formed by the edge of said leaf spring.

8. The apparatus of claim 7 wherein a pair of leaf springs are formed by opposing legs of a single, substantially U-shaped, spring material and a hook is formed by each of the opposed edges of said leaf springs therein defining said spring clip.

9. The apparatus of claim 4 wherein each of said filter elements comprises activated carbon.

10. The apparatus of claim 9 wherein said filter elements are in a substantially linear array.

11. The apparatus of claim 10 wherein the outside diameter of each of said filter elements does not exceed approximately 1.75 inches.

12. Water filtration apparatus which comprises:
   a base member defining first and second sockets therein;
   means for supplying water from an external source to one of said first and second sockets;
   means for delivering water from the other of said first and second sockets to an external application;
   a filtration cartridge having a housing containing therein a plurality of solid, porous, substantially cylindrical, filter elements spaced from said housing to define a first volume therewith, each of said filter elements having a longitudinal axis and a bore extending therealong, the combined bores defining a second volume;
   a cartridge base plate closing said housing and carrying first and second studs having water passages therethrough and insertable, respectively, into said first and second sockets in water flow relationship with said water supplying and water delivering means;
   means within said cartridge for channeling water flow between said first stud and said first volume;
   means within said cartridge for channeling water flow between the second stud and said second volume;
   a key mounted on said cartridge defining a pair of opposed detents thereon; and
   a pair of leaf springs formed by opposing legs of a single, substantially U-shaped, spring material mounted on said base member, each of the opposed edges of said leaf springs forming a hook to receive and secure one of the opposed detents of said key.

13. The apparatus of claim 12 wherein said camming means comprises a shaft extending between the legs of said U-shaped spring material and said manual rotating means comprises a lever mounted to said shaft external of said base member.

14. The apparatus of claim 13 wherein each of said filter elements comprises activated carbon.

15. The apparatus of claim 14 wherein said filter elements are in a substantially linear array.

16. The apparatus of claim 15 wherein the outside diameter of each of said filter elements does not exceed approximately 1.75 inches.

* * * * *